(12) United States Patent
Yang et al.

(10) Patent No.: US 7,523,123 B2
(45) Date of Patent: Apr. 21, 2009

(54) MAP-REDUCE WITH MERGE TO PROCESS MULTIPLE RELATIONAL DATASETS

(75) Inventors: Hung-Chih Yang, Sunnyvale, CA (US); Ali Dasdan, San Jose, CA (US); Ruey-Lung Hsiao, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 222 days.

(21) Appl. No.: 11/560,523

(22) Filed: Nov. 16, 2006

(65) Prior Publication Data

US 2008/0120314 A1 May 22, 2008

(51) Int. Cl.
*G06F 17/00* (2006.01)
(52) U.S. Cl. .................. 707/101; 707/102; 707/104.1
(58) Field of Classification Search ................. None
See application file for complete search history.

(56) References Cited

U.S. PATENT DOCUMENTS 6,678,691 B1 * 1/2004 Kikkers ................ 707/102
7,065,618 B1 6/2006 Ghemawat et al.

OTHER PUBLICATIONS

Larson, "Grouping and Duplicate Elimination: Benefits of Early Aggregation", Technical Report MSR-TR-97-36, Microsoft Corporation, Dec. 20, 1997, 25 pages.*
Jeffrey Dean and Sanjay Ghemawat, "MapReduce: Simplified Data Processing on Large Clusters", USENIX Association OSDI '04: 6th Symposium on Operating Systems Design and Implementation, Dec. 6-8, 2004, pp. 137-149.

* cited by examiner

*Primary Examiner*—Uyen T. Le
(74) *Attorney, Agent, or Firm*—Beyer Law Group LLP

(57) ABSTRACT

A method of processing relationships of at least two datasets is provided. For each of the datasets, a map-reduce subsystem is provided such that the data of that dataset is mapped to corresponding intermediate data for that dataset. The intermediate data for that dataset is reduced to a set of reduced intermediate data for that dataset. Data corresponding to the sets of reduced intermediate data are merged, in accordance with a merge condition. In some examples, data being merged may include the output of one or more other mergers. That is, generally, merge functions may be flexibly placed among various map-reduce subsystems and, as such, the basic map-reduce architecture may be advantageously modified to process multiple relational datasets using, for example, clusters of computing devices.

55 Claims, 5 Drawing Sheets

MAP-REDUCE WITH MERGE TO PROCESS MULTIPLE RELATIONAL DATASETS

BACKGROUND

MapReduce is a programming methodology to perform parallel computations over distributed (typically, very large) data sets. Some theory regarding the MapReduce programming methodology is described in "MapReduce: Simplified Data Processing on Large Clusters," by Jeffrey Dean and Sanjay Ghemawat, appearing in OSDI'04: Sixth Symposium on Operating System Design and Implementation, San Francisco, Calif., December, 2004 (hereafter, "Dean and Ghemawat"). A similar, but not identical, presentation is also provided in HTML form at the following URL: http://labs.google.com/papers/mapreduce-osdi04-slides/index.html (hereafter, "Dean and Ghemawat HTML").

FIG. 1 simplistically illustrates the architecture of a map-reduce system 100. Basically, a "map" function 102 maps key-value pairs to new (intermediate) key-value pairs. A "reduce" function 104 represents all mapped (intermediate) key-value pairs sharing the same key to a single key-value pair or a list of values. The "map" function 102 and "reduce" function 104 are typically user-provided.

In general, a map function (which may actually be a group of map functions, each operating on a different computer) iterates over a list of independent elements, performing an operation on each element as specified by the map function. The map function generates intermediate results. A reduce operation takes these intermediate results via an iterator and combines elements as specified by the reduce function.

It is useful to consider that the data within a map-reduce system may be thought of as being characterized by key/value pairs. For example, both the input dataset and the output of the reduce function may be thought of as a set of key value pairs. The programmer specifies the map function, to process input key/value pairs and produces a set of intermediate pairs. The set of intermediate pairs is not explicitly represented in FIG. 1. The reduce function combines all intermediate values for a particular key and produces a set of merged output values for the key, usually just one.

While the map function and reduce function have been discussed above as being a single map function, the map function may, in implementation, be accomplished by multiple map sub-functions, each of the multiple map sub-functions operating on a different split of the input dataset. In any case, however, the input data set is homogeneous in that the entire input dataset is characterized by a schema according to which all of the multiple map sub-functions operates. Similarly, even if multiple reduce sub-functions operate on different partitions of the mapper output(s), the intermediate data set is homogeneous in that the entire intermediate data set is characterized according to a schema according to which all of the reduce sub-functions operate.

SUMMARY

A method of processing relationships of at least two datasets is provided. For each of the datasets, a map-reduce subsystem is provided such that the data of that dataset is mapped to corresponding intermediate data for that dataset. The intermediate data for that dataset is reduced to a set of reduced intermediate data for that dataset. Data corresponding to the sets of reduced intermediate data are merged, in accordance with a merge condition.

In some examples, data being merged may include the output of one or more other mergers. That is, generally, merge functions may be flexibly placed among various map-reduce subsystems and, as such, the basic map-reduce architecture may be advantageously modified to process multiple relational datasets using, for example, clusters of computing devices.

DETAILED DESCRIPTION

The inventors have realized that, by merging the outputs of map-reduce processes separately operating on two or more datasets, the relationships of the two or more datasets may be processed, for example, according to user-defined logic. More generally, an N-way merge may be accomplished by merging the outputs of map-reduce processes separately operating on N datasets. In many examples, the roles of the mappers and reducers may be conventional.

Figure 1:
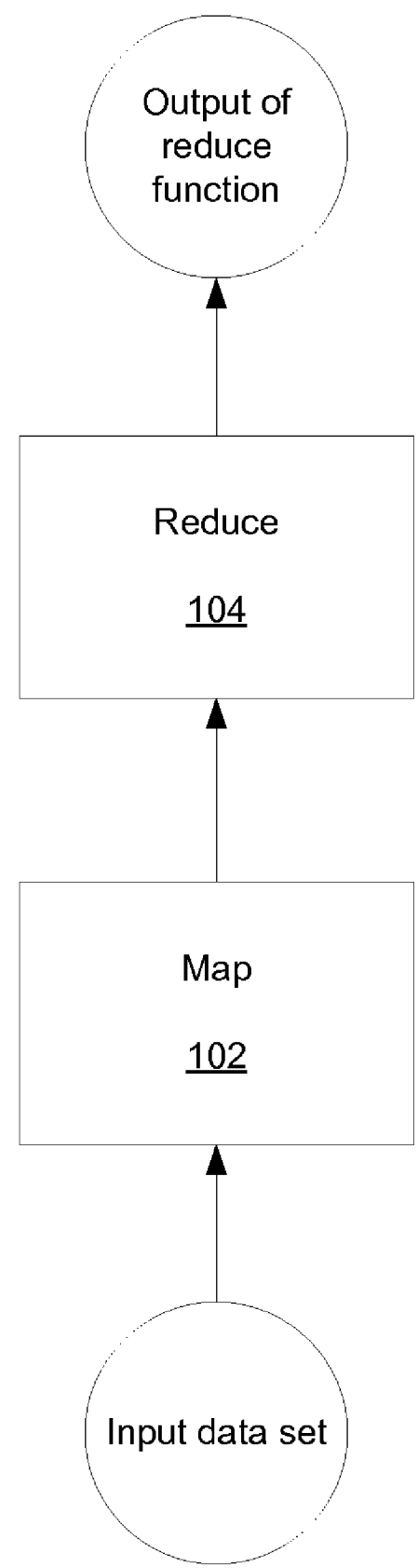
FIG. 1 simplistically illustrates the architecture of a map-reduce system.
Figure 2:
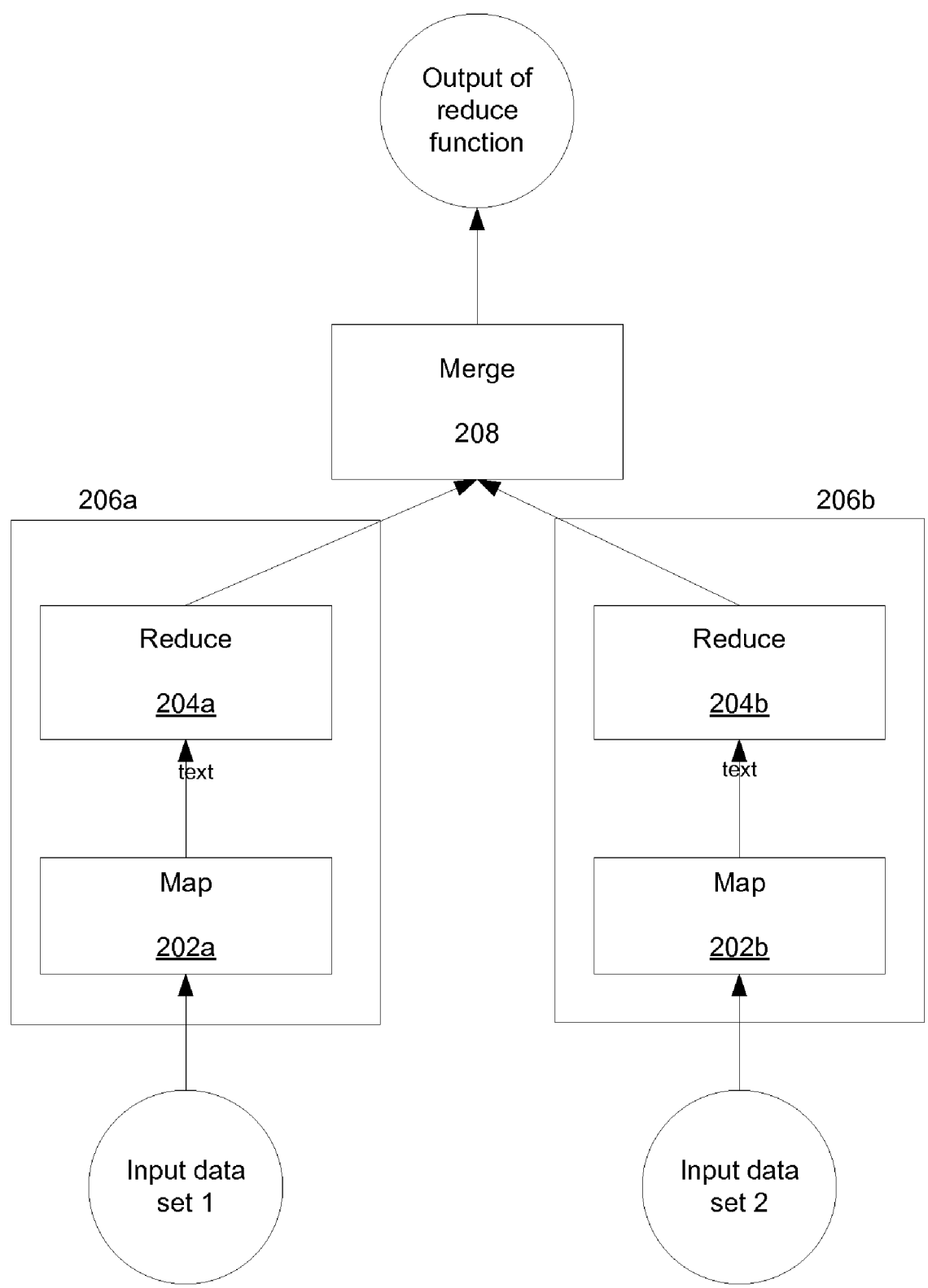
FIG. 2 illustrates an example in which the outputs of two map-reduce subsystems are merged together.

That is, for example, as shown in FIG. 2, map function 202a and reduce function 204a comprise a first map-reduce subsystem 206a, with respect to an input dataset 1. This is similar to the map-reduce system 100 of FIG. 1. Moreover, a map function 202b and reduce function 204b comprise a second map-reduce subsystem 206b, with respect to an input dataset 2. Again, this is similar to the map-reduce system 100 of FIG. 1.

Furthermore, a merge function 208 operates to collect records from the two map-reduce subsystems 206a and 206b, to merge records from the multiple sources based on a merge condition. The merge function 208, then, operates to relate input dataset 1 to input dataset 2. Due to the use of the map-reduce architecture, such a relation can be accomplished using a scalable, fault-tolerant, distributed and relatively inexpensive cluster-based storage system.

The merge function 208 is typically user-provided and may, for example, be effective to accomplish relational database operations, such as a "join" operation, over multiple individually homogeneous input datasets.

More generally, "N" such input datasets may be operated upon in this manner using, for example, "N" map-reduce subsystems. As is also illustrated herein, merge functions may be flexibly placed among various map-reduce subsystems and, as such, the basic map-reduce architecture may be advantageously modified to process multiple relational datasets using, for example, clusters of computing devices.

Figure 3:
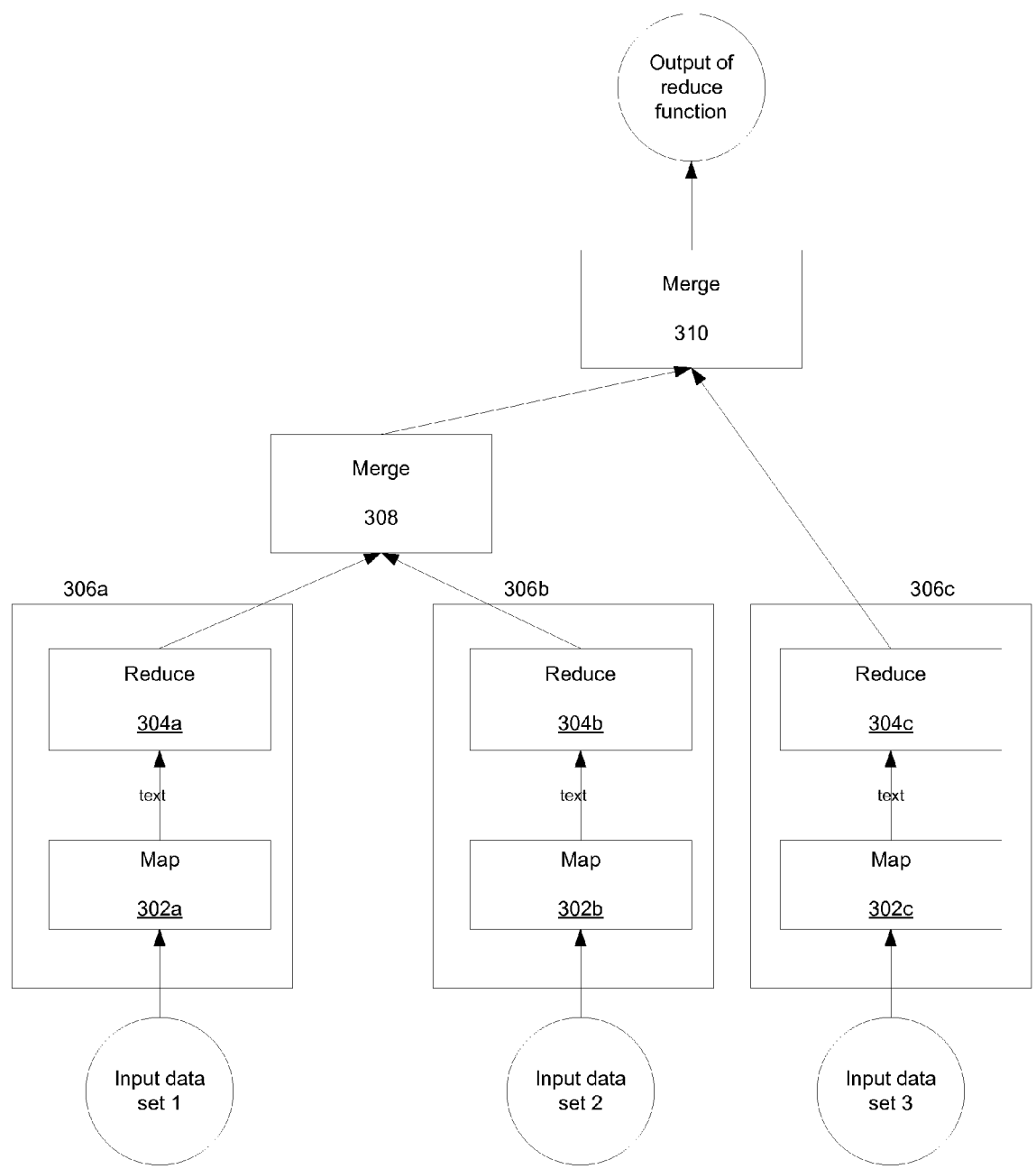
FIG. 3 illustrates a configuration that may be thought of as an extension to the FIG. 2 configuration, in which an additional merge function is applied to the output of the FIG. 2 merge function and an additional (third) map-reduce subsystem.

FIG. 3 illustrates a configuration that may be thought of as an extension to the FIG. 2 configuration. The portion of the FIG. 3 including map-reduce subsystem 302a, map-reduce subsystem 302b and merge function 304 is similar to the FIG. 2 configuration. In addition, a map-reduce subsystem 302c is provided, with respect to input data set 3. An additional merge function 306 is provided that merges the output of the merge function 304 and of the reducer of the map-reduce subset 302c. It can be seen, then, that a merge function may take, as input, the output of either reducers or other merge functions.

Figure 4:
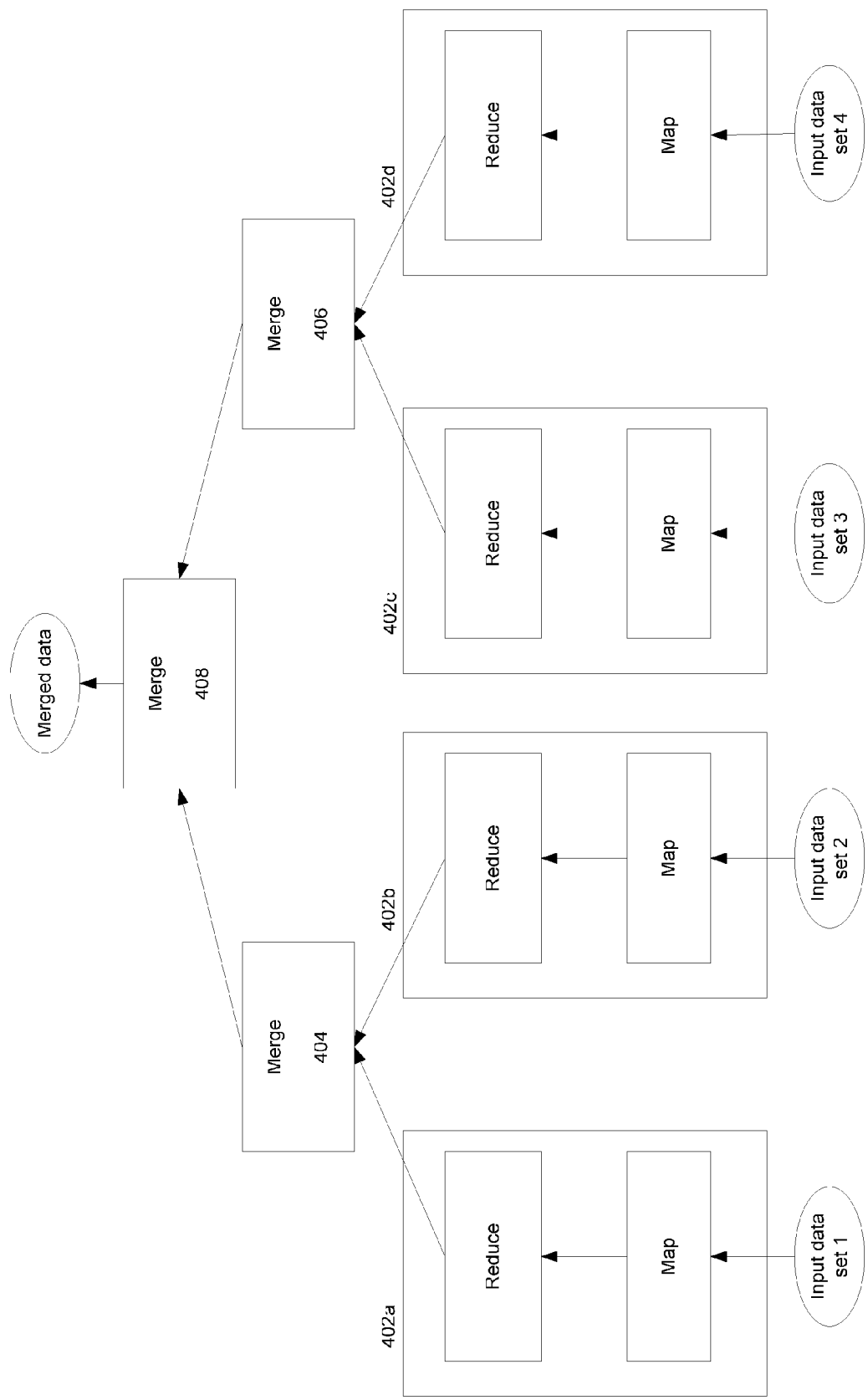
FIG. 4 illustrates a configuration where some of merge functions take, as input, the output of two reducers.

FIG. 4 illustrates a configuration where some of merge functions take, as input, the output of two reducers. Another of the merge functions takes, as input, the output of two merge functions. In particular, referring to FIG. 4, the map-reduce subsystem 402a, the map-reduce subsystem 402b, the map-reduce subsystem 402c and the map-reduce subsystem 402d take, as input respectively, the input data set 1, the input data set 2, the input data set 3 and the input data set 4.

A merge function 404 takes, as input, the output of the reducers of the map-reduce subsystem 402a and of the map-reduce subsystem 402b. The merge function 406 takes, as input, the output of the reducers of the map-reduce subsystem 402c and of the map-reduce subsystem 402d. Finally, the merge function 408 takes, as input, the output of the merge functions 404 and 406. Using merge functions, a parallel relational data processing system may be implemented with three or more parallel passes.

It should be noted, however, that more generally a merger can be associated with one or more reducers from a particular data source. Reading one partition from each source is a simple scenario. For example, one merger may read data from multiple reducers (e.g., if the number of mergers and reducers do not match). In some examples, a merger may merge one reducer partition from one source with multiple reducer partitions from another source.

Figure 5:
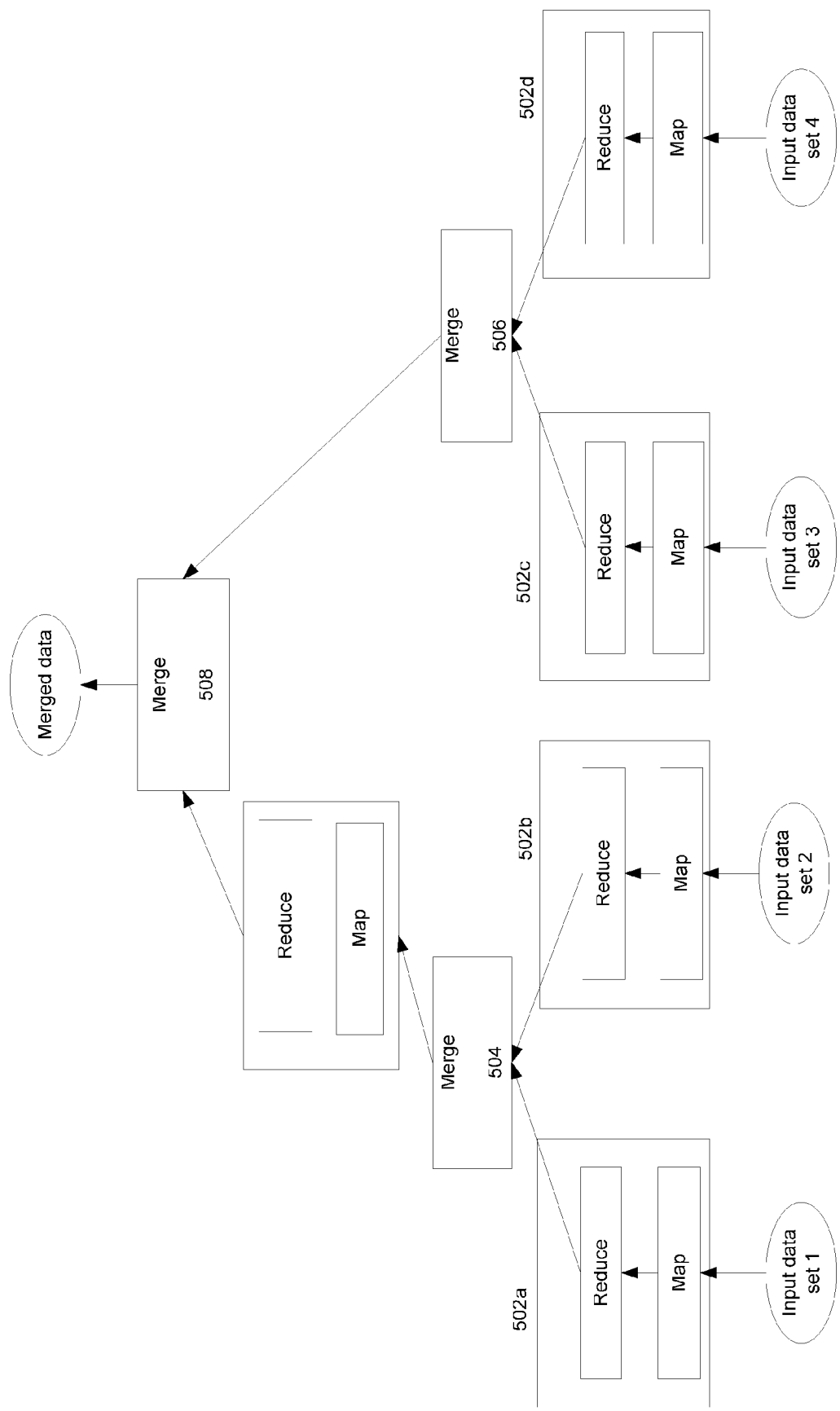
FIG. 5 illustrates an example in which a merger output is re-processed, re-partitioned and re-sorted (on different keys) before being passed to another merger.

FIG. 5 illustrates how a merger output may be re-processed, re-partitioned and re-sorted (on different keys) before being passed to another merger. In the FIG. 5 example, the output of the merge function 504 is passed through map-reduce subsystem 502e before being passed to merger 508. Re-processing and re-partitioning of the output of the merge function 504 is accomplished by the map function of the map-reduce subsystem 502e and re-sorting is accomplished by the reduce function of the map-reduce subsystem 502e.

We now discuss how the various map, reduce and merge functions may be allocated to computing devices of a computing cluster. In general, map and reduce functions may be allocated to different computing devices of a computing cluster and distributed file system, as described in Dean and Ghemawat and Dean and Ghemawat HTML, referenced in the Background portion of this patent application. It is known that, as a result, relatively fault-susceptible commodity computing devices may be combined in an effective and relatively fault-tolerant manner.

As discussed above, a merge function receives input from two sets of reducers. The merge function may include a merge input selector to determine which reducer outputs to merge. In one example, the merge input selector may be configured such that the merger is configured to read from only a selected set of reducers.

Furthermore, a merge function may have a one-to-one relationship with members of one reducer and, in fact, may be co-located with the associated reducer on the same computing device of a cluster of computing devices. In such a case, the merge function may obtain the associated reducer output locally and connect to members of the other set of reducers (e.g., using a remote procedure call) to obtain the output from those reducers. Thus, for example, the reducer output may not be provided to the distributed file system of the map-reduce system. Furthermore, the selector of the merge function use reducer output ranges (typically, user configurable) to determine which reducer outputs to merge. Thus, the selector may use these reducer output ranges to determine whether to even connect to members of the other set of reducers.

It is noted that, in some examples, the selector configuration may be user-defined to determine, in all instances, to connect to all members of the reducers. That is, the selectors may be configured to treat the reducer output ranges (if provided) as "don't care."

Reducer output, in general, includes a set of values. In accordance with an example, the reducer output provides keys that correspond to the output set of values. Thus, in accordance with this example, the reducer output may be considered a tuple, where each tuple is characterized at least by a key/value pair.

A matcher of a merge function receives two keys, from two respective reducers, and determines from the received keys whether the tuples characterized by the key should be merged. For example, the signature of a merge function may follow the signature of the reducers or the signature of a merge function may follow the signature of the mappers. Specific applications are discussed below.

Thus, for example, there are various relational operations that can be enabled through the use of a merge function in a map-reduce system. For example, relational operations such as join operations, such as natural join, equijoin, theta-join, semi-join and anti-join operations. Conventional map-reduce architectures do not account for handling two or more data sets at the same time. Other relational operations that may be enabled through the use of a merge function include set operations, such as union, difference, intersection and Cartesian product. Yet another relational operation that may be enabled through the use of a merge function includes a division operation. Yet another relational operations that may be enabled includes outer join operations, such as left outer join, right outer join and full outer join, and projection and selection. (It is noted that in some examples, relational projection and relational select operations may be accomplished by appropriately configuring mappers. An SQL "having" operation and an aggregation operation may be accomplished by appropriately configuring reducers.)

The matchers may be considered to act as predicates such as in the "where" clause of a relational SQL query. For example, for an equal-join condition, tuples that have an equivalent key value would be merged. It is noted that they key values may be equivalent without necessarily being identical as is the case, for example, if the keys have different data types. The equivalency condition may be user-defined in the matcher.

As some specific merge examples, if the reducer output is sorted by key order (for example, in a range sorted manner), then the merger can be based on the ordered keys (e.g., by doing merge joins over the sorted ranges from each reducer). If the reducer output is sorted on a hashed key, then the merger can accomplish a hash-join merger. For example, a merger may use one set as a "build" set to build a hash table and another set as a "probe" set. The reducers may aggregate data with the same hashed partition number (the data may still have unique hash values but be partitioned to the same partition number), with partitioned being hash-joined in a merger.

A block-nested-loop merger may accomplish a block-nested-loop join operation (when, for example, the selectivity is high among reducer outputs). Data may be partitioned (e.g., by mappers and reducers) to reduce nested-loop size. Mergers may be read one partition from each of the two upstream reducers, and the partitions are nested-loop joined in a merger.

As yet another example, the reducer outputs need not be heterogeneous. That is, for example, a union merger may receive homogenous reducer outputs and produce a union of those homogeneous outputs. For example, a mapper may use a combiner to union data from a mapper partition, and the reducers may further unionize data from one dataset. The mergers may read one partition from each of the two upstream reducers and union the read partition.

We now discuss a particular example application in which there are two sources of data—employee data and department data. In the example, a join is used between the employee dataset and the department dataset in order to compute bonuses.

An employee mapper iterates through the employee dataset and gets an employee-id and a department-id. The mapper computes various bonuses and emits records with key as (department-id, employee-id) pair and bonus as value. An example of the employee mapper is shown below, in pseudocode:

```
Map (String key, String value):
// key: employee-id
// value: employee-info
<get department-id from employee-info>
<compute bonus using employee-info>
EmitIntermediate ((department-id, employee-id), bonus)
```

An employee reducer sorts the outputs of the employee mapper based on the key (department-id, employee-id), sums up an employee's various bonuses, and emits the same key with a bonus-sum as value. An example of the employee reducer is shown below, in pseudocode:

```
Reduce(String key, Iterator value):
// key:department-id and employee-id pair
// values: a list of bonuses
<sums up an employee's various bonuses>
EmitIntermediate ((department-id, employee-id), bonus-sum)
```

A department mapper iterates through the department table, getting and emitting the department-id and department-info. An example of the department mapper is shown below, in pseudocode:

```
Map (String key, String value):
// key: department-id
// value: department-info
...
EmitIntermediate (department-id, department-info)
```

A department reducer sorts and emits the department mapper sorts and emits the department reducer output. An example of the department reducer is shown below, in pseudocode:

```
Reduce(String key, Iterator value):
// key:department-id
// values: department-info
EmitIntermediate (department-id, department-info)
```

The merger's select task selects the intersection of the reducer outputs, so that they can be merged. An example of the merger's select task is shown below, in pseudocode:

```
Select (String keyDepartmentEmployeeIdStart,
    String keyDepartmentEmployeeIdEnd,
    String keyDepartmentIdStart,
    String keyDepartmentIdEnd):
// keyDepartmentEmployeeIdStart, keyDepartmentEmployeeIdEnd: the
//    range of the key values from a left reducer output.
// keyDepartmentIdStart, keyDepartmentIdEnd: the range of the key values
//    from a right reducer output.
Return TRUE if (keyDepartmentEmployeeIdStart.department-id,
    keyDepartmentEmployeeIdEnd) intersects with
    (keyDepartmentIdStart, keyDepartmentIdEnd)
else FALSE
```

The merger's match task matches records from the department reducer and from the employee reducer with the same department-name. An example of the merger's match task is shown below, in pseudocode:

```
Match (String keyDepartmentEmployeeId, String keyDepartmentId):
// keyDepartmentEmployeeId: department-id and employee-id pair
//    from the left Map-Reduce process
// keyDepartmentId: department-id from the right Map-Reduce process
Return TRUE if (keyDepartmentEmployeeId.department-id ==
keyDepartmentId)
else FALSE
```

Finally, the merger body adjusts employee-bonus using the department-info and emits employee-id and his/her final bonus number. An example of the merger is shown below, in pseudocode:

```
Merge (String keyDepartmentEmployeeId, Iterator valueBonusSum, String
    keyDepartmentId, Iterator valueDepartmentInfo):
// keyDepartmentEmployeeId: department-id and employee-id pair from
//    the left Map-Reduce process
// keyDepartmentId: department-id from the right Map-Reduce process
// valueBonusSum: bonus-sum from the left Map-Reduce process.
// valueDepartmentInfo: department-info from the right Map-Reduce
//    process <adjust an employee's bonus-sum using department-info>
Emit (employee-id, adjusted-bonus-sum)
```

We now discuss some other example applications of applying a merge function within a map-reduce architecture. In one example, datasets maintained by a search engine are processed. For example, search engine datasets may include a web-page index, a web-page attribute repository, web crawl results and click logs. The datasets may be joined to obtain useful metrics about the search engine itself, such as joining the click logs dataset with the web-page attribute repository, to determine the attributes (such as page-rank or host-trust) of the most clicked web pages.

In accordance with another example, large databases across companies may be joined. For example, a car manufacturer may have a large part dataset organized by car, while a part provider has a large part-supplier dataset. The two datasets may be joined to obtain a complete list of part-suppliers for all the parts in a particular car.

What is claimed is:

1. A method of processing data and data relationships of at least two datasets, comprising:
   for the data of each one of the datasets,
      mapping the data of that dataset to corresponding intermediate data for that dataset; and
      reducing the intermediate data for that dataset to a set of reduced intermediate data for that dataset; and merging data corresponding to the sets of reduced intermediate data, in accordance with a merge condition.

2. The method of claim 1, wherein:
each set of mapped intermediate data includes a set of tuples;
each set of reduced intermediate data includes a set of tuples;
the merging step includes executing a selector task that determines, based at least in part on the merge condition, which tuples of the sets of reduced intermediate data to merge, the merged output includes a set of tuples that are produced based on the reduced intermediate data.

3. The method of claim 1, wherein:
each set of mapped intermediate data includes a set of tuples, each tuple characterized as a collection of attributes;
each set of reduced intermediate data includes a set of tuples, each tuple characterized as a collection of attributes;
the merge condition includes a relationship between keys characterizing the tuples.

4. The method of claim 3, further comprising:
configuring the merge condition.

5. The method of claim 3, wherein:
the relationship between keys of the tuples includes a key of a tuple of one set of reduced intermediate data being equivalent to a key of a tuple of another set of reduced intermediate data.

6. The method of claim 1, wherein:
each set of mapped intermediate data includes a set of tuples, each tuple characterized by a key/value pair, wherein the keys and values are characterized as sets of attributes;
each set of reduced intermediate data includes a set of tuples, each tuple characterized by a key/value pair, wherein the keys and values are characterized as sets of attributes.

7. The method of claim 6, wherein:
the merging step includes merging the tuples for which the keys are equivalent based on conditions defined by a user-defined procedure.

8. The method of claim 1, wherein:
the at least two datasets include a first dataset and a second dataset but do not include a third dataset;
the merging step is a first merging step; and
the method further comprises:
mapping the data of the third dataset to corresponding intermediate data for the third dataset; and
reducing the intermediate data for the third dataset to a set of reduced intermediate data for the third dataset; and
a second merging step, comprising merging data corresponding to the set of reduced intermediate data for the third dataset with data corresponding to an output of the first merging step.

9. The method of claim 1, wherein:
the at least two datasets include a first dataset and a second dataset but do not include a third dataset and a fourth dataset;
the merging step is a first merging step; and
the method further comprises:
for the data of each of third and fourth datasets,
mapping the data of that dataset to corresponding intermediate data for that dataset; and
reducing the intermediate data for that dataset to a set of reduced intermediate data for that dataset; and
a second merging step, comprising merging the set of reduced intermediate data for the third dataset with the set of reduced intermediate data for the fourth dataset; and
a third merging step, comprising merging data corresponding to an output of the first merging step with data corresponding to an output of the second merging step.

10. The method of claim 9, further comprising:
mapping the output of the first merging step to intermediate data for the output of the first merging step; and
reducing the intermediate data for the output of the first merging step to a set of reduced intermediate data for the output of the first merging step;
wherein the reduced intermediate data for the output of the first merging step is the data corresponding to an output of the first merging step.

11. The method of claim 1, wherein:
the mapping, reducing and merging steps include processing metadata of the data processed at each respective one of the steps.

12. The method of claim 11, wherein:
the metadata processed at each of the mapping, reducing and merging steps indicates characteristics, types and attributes of the data processed at that step.

13. The method of claim 11, wherein:
the metadata processed at each step is provided to another step in a pipelined fashion.

14. The method of claim 1, wherein:
data processed at the mapping step is read from at least one of the group consisting of:
a plurality of file system sources;
a plurality of data repository sources;
mapping step intermediate outputs;
reducing step intermediate outputs; and
merging step intermediate outputs.

15. The method of claim 1, wherein:
at least some of the mapping, reducing and merging steps occur on a single computing device such that data being shared between such steps need not be stored to disk.

16. The method of claim 15, wherein:
the merging step is combined with a succeeding mapping step, thereby saving a disk access by the succeeding mapping step.

17. The method of claim 15, wherein:
the reducing step is combined with a succeeding mapping step, thereby saving a disk access by the succeeding mapping step.

18. The method of claim 15, wherein:
the reducing step for one dataset is combined with the merging step, and
the merging step reads intermediate remotely from a reducer for another dataset.

19. A computing system configured to process relationships of at least two datasets, the computing system including at least one computing device configured to:
for the data of each one of the datasets,
map the data of that dataset to corresponding intermediate data for that dataset; and
reduce the intermediate data for that dataset to a set of reduced intermediate data for that dataset; and
merge data corresponding to the sets of reduced intermediate data, in accordance with a merge condition.

20. The computing system of claim 19, wherein:
the at least one computing device being configured to map the data of the data set to corresponding intermediate data for that dataset includes each of a first portion of a plurality of the at least one computing devices being configured to execute a separate mapping process, in parallel;

the at least one computing device being configured to reduce the data of the data set to a set of reduced intermediate data for that dataset includes each of a second portion of a plurality of the at least one computing devices being configured to execute a separate reducing process, in parallel;

the at least one computing device being configured to merge the sets of the reduced intermediate data includes each of a third portion of a plurality of the at least one computing devices being configured to execute a separate merge process, in parallel.

21. The computing system of claim 20, wherein:
each of the first portion of the plurality of computing devices is configured to produce intermediate data that is partitioned into intermediate data input files to be provided to every one of the second portion of computing devices;

each of the second portion of the plurality of computing devices is configured to receive all of the intermediate data input files; and each of the third portion of the plurality of computing devices is configured to receive selected outputs from at least two of the second portion of the plurality of computing devices.

22. The computing system of claim 21, wherein:
each of at least some of the second portion of computing devices is configured to execute the separate reducing process in response to at least a partial set of the intermediate data input files being provided; and each of at least some of the third portion of computing devices is configured to execute the separate merging process in response to at least a partial set of the selected outputs from at least two of the second portion of the plurality of computing devices being ready.

23. The computing system of claim 19, wherein:
the map, reduce and merge are computed in a pipelined fashion.

24. The computing system of claim 19, wherein:
the at least one computing device being configured to map the data of the data set to corresponding intermediate data for that dataset includes the at least one computing devices being configured to execute a plurality of mapping processes;

the at least one computing device being configured to reduce the data of the data set to a set of reduced intermediate data for that dataset includes the at least one computing device being configured to execute a plurality of reducing processes;

the at least one computing device being configured to merge the sets of the reduced intermediate data includes the at least one computing device being configured to execute a plurality of merge processes;

each of the reducing processes is configured to reduce data, of the intermediate data input files, for a partition to which that reducing process corresponds; and each of the merging processes is configured to merge data, of the selected outputs from at least two of the reducing processes, for a partition to which that merging process corresponds.

25. The computing system of claim 24, wherein:
each of the mapping processes is configured to partition the produced intermediate data based on a hash process applied to the intermediate data and to store each partition of the intermediate data in a file that corresponds to a result of the applied hash process; and each of the merging processes being configured to merge data for a partition to which that merging process corresponds includes merging data for partitions based on the result of the applied hash process.

26. The computing system of claim 24, wherein:
each of the mapping processes is configured to partition the produced intermediate data based on a determination of which range of values the intermediate data belongs and to store each partition of the intermediate data in a file that corresponds to the range to which the value of the intermediate data is determined to belong; and each of the merging processes being configured to merge data for a partition to which that merging process corresponds includes merging data for partitions based on the result of the range determining process.

27. The computing system of claim 24, wherein each of the merging processes is configured to:
read from at least two sets of reduced intermediate data; and select which subsets from the at least two sets of reduced intermediate data to merge, using a reducing process identification that uniquely identifies each subset of reduced intermediate data with a reducing process from which that subset of reduced intermediate data is provided.

28. The computing system of claim 19, wherein:
the at least one computing device is configured such that the mapping, reducing and merging collectively accomplish a relational operation.

29. The computing system of claim 28, wherein the at least one computing device is configured such that the relational operation is a relational algebra operation.

30. The computing system of claim 29, wherein the at least one computing device is configured with the merge condition so as to merge only records with same keys from the sets of reduced intermediate data, to accomplish a relational algebra "natural join" or "equijoin" operation.

31. The computing system of claim 29, wherein the at least one computing device is configured with the merge condition corresponding to a particular algebraic condition, such that only data related by the particular algebraic condition are included in the merged data, to accomplish a "theta join" operation.

32. The computing system of claim 29, wherein the at least one computing device is configured with the merge condition such that all of the reduced intermediate data is included in the merged data, to accomplish a "union" operation.

33. The computing system of claim 29, wherein the at least one computing device is configured with the merge condition corresponding to a particular algebraic condition, such that only data that is present in both of two subsets of the reduced intermediate data is included in the merged data, to accomplish an "intersection" operation.

34. The computing system of claim 29, wherein the at least one computing device is configured with the merge condition corresponding to a particular algebraic condition, such that only data that is present in one subset of the reduced intermediate data, that is not included in a second subset of the reduced intermediate data, is included in the merged data, to accomplish a "difference" relational algebra operation or a database query language "not in" and "not exists" operation.

35. The computing system of claim 29, wherein the at least one computing device is configured with the merge condition corresponding to a particular algebraic condition, such that one tuple of the merged output data is one tuple present in one subset of the reduced intermediate data combined with every tuple present in a second subset of the reduced intermediate data, to accomplish a "Cartesian product" relational algebra operation.

36. The computing system of claim 28, wherein the at least one computing device is configured such that the relational operation is a relational join operation.

37. The computing system of claim 36, wherein the at least one computing device is configured, to accomplish a hash join operation, to:
  map the data of the input data sets to accomplish hash partitioning of the input data sets;
  reduce to at least sort and group partitioned intermediate data with the same key values; and
  merge same-key data from at least two reduced sets of intermediate data.

38. The computing system of claim 36, wherein the at least one computing device is configured, to accomplish a sort-merge join operation, to:
  map the data of the input data sets to accomplish range partitioning of the input data sets;
  reduce to at least sort and group partitioned intermediate data with the same key values; and
  merge same-key data from at least two reduced sets of intermediate data.

39. The computing system of claim 36, wherein the at least one computing device is configured, to accomplish a nested-loop join operation, to:
  map the data of the input data sets to accomplish partitioning of the input data sets;
  reduce to at least sort and group partitioned intermediate data with the same key values; and
  merge same-key data from at least two reduced sets of intermediate data.

40. A method of configuring a computing system to process data and data relationships of at least two datasets, comprising:
  for the data of each one of the datasets,
    configuring the computing system to include a mapping function to map data of that dataset to corresponding intermediate data for that dataset; and
    configuring the computing system to include a reducing function to reduce the intermediate data for that dataset to a set of reduced intermediate data for that dataset; and
  configuring the computing system to include a merging function to merge data corresponding to the sets of reduced intermediate data, in accordance with a merge condition.

41. The method of claim 40, further comprising:
configuring the computing system to organize the mapping, reducing and merging function to operate in a pipelined fashion.

42. The method of claim 41, wherein:
configuring the computing system to organize the mapping, reducing and merging function to operate in a pipelined fashion includes configuring a direction of dataflow among the mapping, reducing and merging functions.

43. The method of claim 41, wherein:
configuring the computing system to organize the mapping, reducing and merging function to operate in a pipelined fashion includes configuring a source and destination of data processed by the mapping, reducing and merging functions.

44. The method of claim 41, wherein:
the configuring is according to a configuration provided by a user.

45. The method of claim 41, wherein:
the configuring is according to a configuration at least part of which is determined automatically.

46. A computer program product for processing data and data relationships of at least two datasets, the computer program product comprising at least one computer-readable medium having computer program instructions stored therein which are operable to cause at least one computing device to:
  for the data of each one of the datasets,
    map the data of that dataset to corresponding intermediate data for that dataset; and
    reduce the intermediate data for that dataset to a set of reduced intermediate data for that dataset; and
  merge data corresponding to the sets of reduced intermediate data, in accordance with a merge condition.

47. The computer program product of claim 46, wherein:
each set of mapped intermediate data includes a set of tuples;
each set of reduced intermediate data includes a set of tuples;
the merging computer program instructions includes computer program instructions operable to cause the at least one computer device to execute a selector task that determines, based at least in part on the merge condition, which tuples of the sets of reduced intermediate data to merge, the merged output includes a set of tuples that are produced based on the reduced intermediate data.

48. The computer program product of claim 46, wherein:
each set of mapped intermediate data includes a set of tuples, each tuple characterized as a collection of attributes;
each set of reduced intermediate data includes a set of tuples, each tuple characterized as a collection of attributes;
the merge condition includes a relationship between keys characterizing the tuples.

49. The computer program product of claim 48, further comprising:
computer program instructions operable to cause the at least one computer device to configure the merge condition.

50. The computer program product of claim 48, wherein:
the relationship between keys of the tuples includes a key of a tuple of one set of reduced intermediate data being equivalent to a key of a tuple of another set of reduced intermediate data.

51. The computer program product of claim 46, wherein:
each set of mapped intermediate data includes a set of tuples, each tuple characterized by a key/value pair, wherein the keys and values are characterized as sets of attributes;
each set of reduced intermediate data includes a set of tuples, each tuple characterized by a key/value pair, wherein the keys and values are characterized as sets of attributes.

52. The computer program product of claim 51, wherein:
the merging computer program instructions includes computer program instructions operable to cause the at least one computer device to merge the tuples for which the keys are equivalent based on conditions defined by a user-defined procedure.

53. The computer program product of claim 46, wherein:
the at least two datasets include a first dataset and a second dataset but do not include a third dataset;

the merging computer program instructions are first merging instructions; and the computer program instructions are further operable to cause at least one computing device to:

map the data of the third dataset to corresponding intermediate data for the third dataset; and reduce the intermediate data for the third dataset to a set of reduced intermediate data for the third dataset; and wherein the computer program instructions further include second merging instructions operable to cause the at least one computing device to merge data corresponding to the set of reduced intermediate data for the third dataset with data corresponding to an output of the first merging instructions.

54. The computer program product of claim 46, wherein:

the at least two datasets include a first dataset and a second dataset but do not include a third dataset and a fourth dataset;

the merging computer program instructions are first merging instructions; and the computer program instructions are further operable to cause at least one computing device to:

for the data of each of third and fourth datasets, map the data of that dataset to corresponding intermediate data for that dataset; and reduce the intermediate data for that dataset to a set of reduced intermediate data for that dataset;

wherein the computer program instructions further include second merging instructions operable to cause the at least one computing device to merge the set of reduced intermediate data for the third dataset with the set of reduced intermediate data for the fourth dataset; and wherein the computer program instructions further include second merging instructions operable to cause the at least one computing device to merge data corresponding to an output of the at least one computing device operating according the first merging instructions with data corresponding an output of the at least one computing device operating according to an output of the second merging instructions.

55. The computer program product of claim 54, wherein the computer program instructions are further operable to cause at least one computing device to:

map the output of the first merging step to intermediate data for the output of the at least one computing device operating according the first merging instructions; and reduce the intermediate data for the output of the at least one computing device operating according the first merging instructions to a set of reduced intermediate data for the output of the at least one computing device operating according the first merging instructions;

wherein the reduced intermediate data for the output of the at least one computing device operating according to the first merging instructions is the data corresponding to an output of the at least one computing device operating according to the first merging instructions.

* * * * *